US009329362B2

(12) United States Patent
Suzuki (10) Patent No.: US 9,329,362 B2
(45) Date of Patent: May 3, 2016

(54) IMAGING LENS AND IMAGING APPARATUS

(71) Applicant: FUJIFILM Corporation, Tokyo (JP)

(72) Inventor: Takashi Suzuki, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 52 days.

(21) Appl. No.: 14/306,899

(22) Filed: Jun. 17, 2014

(65) Prior Publication Data

US 2014/0368926 A1 Dec. 18, 2014

(30) Foreign Application Priority Data

Jun. 17, 2013 (JP) .................. 2013-126420

(51) Int. Cl.
*G02B 9/06* (2006.01)
*G02B 13/00* (2006.01)

(52) U.S. Cl.
CPC .......... *G02B 13/0045* (2013.01); *G02B 13/006* (2013.01)

(58) Field of Classification Search
CPC .................................................. G02B 13/003
USPC ...................................................... 359/794
See application file for complete search history.

(56) References Cited

U.S. PATENT DOCUMENTS

| 2009/0086340 A1 | 4/2009 | Sato |
| 2011/0090574 A1 | 4/2011 | Harada et al. |
| 2015/0036228 A1* | 2/2015 | Nagahara ............... G02B 13/04 359/708 |

FOREIGN PATENT DOCUMENTS

| JP | 2009-086221 | 4/2009 |
| JP | 2011-059290 | 3/2011 |
| JP | 2012-123155 | 6/2012 |

* cited by examiner

*Primary Examiner* — James Jones
(74) *Attorney, Agent, or Firm* — Young & Thompson (57) ABSTRACT

The imaging lens substantially consists of a first lens group having positive refractive power, an aperture stop, and a second lens group having positive refractive power, in this order from the object side. The first lens group consists of, in this order from the object side, an eleventh lens group and a twelfth lens group with a largest air space therebetween. The eleventh lens group has at least one negative lens with a concave surface toward the image side, having negative refractive power; and the twelfth lens group has positive refractive power. The second lens group substantially consists of, in this order from the object side, an aspheric lens having at least one aspheric surface, a positive lens, a negative lens, and a three-cemented lens formed by cementing a positive lens, a negative lens, and a positive lens in this order from the object side.

15 Claims, 9 Drawing Sheets

EXAMPLE 1

IMAGING LENS AND IMAGING APPARATUS

CROSS-REFERENCE TO RELATED APPLICATIONS

The present application claims priority under 35 U.S.C. §119 to Japanese Patent Application No. 2013-126420, filed Jun. 17, 2013. Each of the above application(s) is hereby expressly incorporated by reference, in its entirety, into the present application.

BACKGROUND OF THE INVENTION

The present invention relates to an imaging lens, and particularly to a fast lens suitable for an imaging apparatus, such as an electronic camera and the like. Moreover, the present invention also relates to an imaging apparatus including such an imaging lens.

DESCRIPTION OF THE RELATED ART

In recent years, many digital cameras equipped with a large imaging element confirming to, for example, an APS-format, a Four Thirds format or the like are provided in the market. Recently, not only digital single-lens reflex cameras but also lens interchangeable digital cameras and compact cameras without having a reflex finder while including the above large imaging elements are provided. The advantageous effects of these cameras are in the points that the entire system is compact and has superior portability while obtaining high-quality images. The demands for lens systems having a short entire length are greatly increasing associated with miniaturization of cameras.

For example, the imaging lenses as disclosed in Japanese Unexamined Patent Publication No. 2011-059290, Japanese Unexamined Patent Publication No. 2009-086221, and Japanese Unexamined Patent Publication No. 2012-123155 are proposed as a large-diameter imaging lens having an F-value of approximately 1.4 while corresponding to such a large imaging element. All of the imaging lenses disclosed in Japanese Unexamined Patent Publication No. 2011-059290, Japanese Unexamined Patent Publication No. 2009-086221, and Japanese Unexamined Patent Publication No. 2012-123155 have a negative lens on the most object side, which is a so-called retro focus type, or have a lens configuration in which a power arrangement conforming thereto is provided.

SUMMARY OF THE INVENTION

In the imaging lens which is used as an interchangeable lens of a camera, particularly a single-lens reflex camera, there are cases where a long back focus is required in order to dispose various kinds of optical elements between the lens system and the imaging element or to secure an optical path length for a reflex finder. In such a case, a power arrangement of a retro-focus type is appropriate.

There are cases that lens interchangeable cameras without a reflex finder, lens-integrated compact cameras or the like do not require a back focus of the same length as that of an interchangeable lens for a single-lens reflex camera according to the configurations thereof even in the imaging apparatus including large imaging elements such as the APS format and the like as described above.

Note that all of the imaging lenses of Japanese Unexamined Patent Publication No. 2011-059290, Japanese Unexamined Patent Publication No. 2009-086221, and Japanese Unexamined Patent Publication No. 2012-123155 have a configuration in which a negative lens is arranged on the most object side, and a negative lens, a positive lens, and a positive lens are arranged on the image surface side from an aperture stop. In this type of imaging lens, the total optical length is necessarily long in order to secure both a long back focus and optical performance.

In the case that the imaging lenses disclosed in Japanese Unexamined Patent Publication No. 2011-059290, Japanese Unexamined Patent Publication No. 2009-086221, and Japanese Unexamined Patent Publication No. 2012-123155 are applied to imaging apparatuses equipped with large imaging elements, such as the APS format and the like described above, high optical performance can be secured. However, the imaging lenses are also expected to be miniaturized according to the imaging apparatuses having a compact entire system and excellent portability.

The present invention has been developed in view of the above circumstances. It is an object of the present invention to provide a fast imaging lens having a short entire length and a large diameter while securing optical performance, which can be adapted to large imaging elements; and to provide an imaging apparatus equipped with this imaging lens.

The imaging lens of present invention substantially consists of a first lens group having positive refractive power, an aperture stop, a second lens group having positive refractive power in this order from the object side, the first lens group is composed of an eleventh lens group and a twelfth lens group in this order from the object side, with a largest air space therebetween, the eleventh lens group has negative refractive power, substantially consisting of at least one negative lens with a concave surface toward the image side, the twelfth lens group has positive refractive power, and the second lens group substantially consists of, in this order from the object side, an aspheric lens having at least one aspheric surface, and a three-cemented lens formed by cementing a positive lens, a negative lens, and a positive lens in this order from the object side.

In the present invention, surface shapes of lenses, such as a convex surface, a concave surface, a planar surface, biconcave, meniscus, biconvex, plano-convex, plano-concave, and the like; and signs of the refractive powers of lenses, such as positive and negative, should be considered in a paraxial region if aspheric surfaces are included therein, unless otherwise noted. Moreover, in the present invention, the sign of the radius of curvature is positive in the case that a surface shape is convex on the object side, and negative in the case that the surface shape is convex on the image side.

In the imaging lens of the present invention, it is preferable for the twelfth lens group to substantially consist of one positive lens, one positive lens with a convex surface toward the object side, and one negative lens with a concave surface toward the image side in this order from the object side, those are adjacent to each other.

In the imaging lens according to the present invention, it is preferable for a three-cemented lens to be formed by cementing a positive lens with a convex surface toward the image side, a negative lens, and a positive lens with a convex surface toward the image side in this order from the object side.

In the imaging lens according to the present invention, it is preferable for the eleventh lens group to have at least two negative lenses with a concave surface toward the image side.

It is preferable for the imaging lens according to the present invention to be configured such that the second lens group has one or more lens on the image side of the three-cemented lens, and focus adjustment from an object at infinity to an object at a close distance is performed by moving a part, which includes an aspheric lens and the three-cemented lens, of the second lens group, or by moving the entire second lens group toward the object side.

In the imaging lens according to the present invention, it is preferable for the first lens group to remain fixed during focus adjustment from an object at infinity to an object at a close distance.

In the imaging lens according to the present invention, it is preferable that one or more lenses on the image side of the three-cemented lens in the second lens group through a lens on the most image side in the second lens group are fixed during focus adjustment from an object at infinity to an object at a close distance.

In this case, it is preferable for the fixed lenses or lens groups to have negative refractive power.

It is preferable for the imaging lens of the present invention to satisfy any of conditional expressions (1) through (5) below. Note that the imaging lens may satisfy any one of conditional expressions (1) through (5), or may satisfy arbitrary combinations of the conditional expressions.

$$Nd2>1.8 \qquad (1)$$

$$Nd2>1.85 \qquad (1\text{-}1)$$

$$Nd12a>1.8 \qquad (2)$$

$$Nd12a>1.85 \qquad (2\text{-}1)$$

$$0<\theta gF12b-0.6415+0.001618\times vd12b \qquad (3)$$

$$0.012<\theta gF12b-0.6415+0.001618\times vd12b \qquad (3\text{-}1)$$

$$vd12b<35 \qquad (4)$$

$$vd12b<27 \qquad (4\text{-}1), \text{ and}$$

$$vd2p-vd2n>5 \qquad (5).$$

where,
Nd2: the average value of the refractive index with respect to the d-line of the materials of positive lenses in the three-cemented lens,
Nd12a: the refractive index with respect to the d-line of the material of a positive lens or lenses having the highest refractive index with respect to the d-line in the twelfth lens group,
vd12b: the Abbe number with respect to the d-line of the material of one lens L12b of positive lenses included in the twelfth lens group,
θgF12b: a partial dispersion ratio between the g-line and the F-line with respect to the material of one lens L12b of positive lenses included in the twelfth lens group,
vd2p: the Abbe number of the material of a lens having a larger Abbe number with respect to the d-line of two positive lenses in the three-cemented lens, and
vd2n: the Abbe number with respect to the d-line of the material of a negative lens of the three-cemented lens.

The imaging apparatus according to the present invention includes the imaging lens according to the present invention described above.

The imaging lens of the present invention substantially consists of a first lens group having positive refractive power, an aperture stop, and a second lens group having positive refractive power in this order from the object side, wherein a lens configuration of the first lens group and the second lens group are preferably set, thereby allowing the imaging lens to have a short entire length, a large diameter, and high optical performance; and to be capable of favorably correcting various aberrations such as spherical aberration, chromatic aberration and the like.

As the imaging apparatus according to the present invention is equipped with the imaging lens of the present invention, the apparatus can be configured in a small size and at low cost, and can obtain excellent images being bright and high-resolution, with various aberrations corrected.

BRIEF DESCRIPTION OF THE DRAWINGS

A and B of FIG. 12 are schematic configuration diagrams of an imaging apparatus according to another embodiment of the present invention.

DESCRIPTION OF THE PREFERRED EMBODIMENTS

Figure 1:
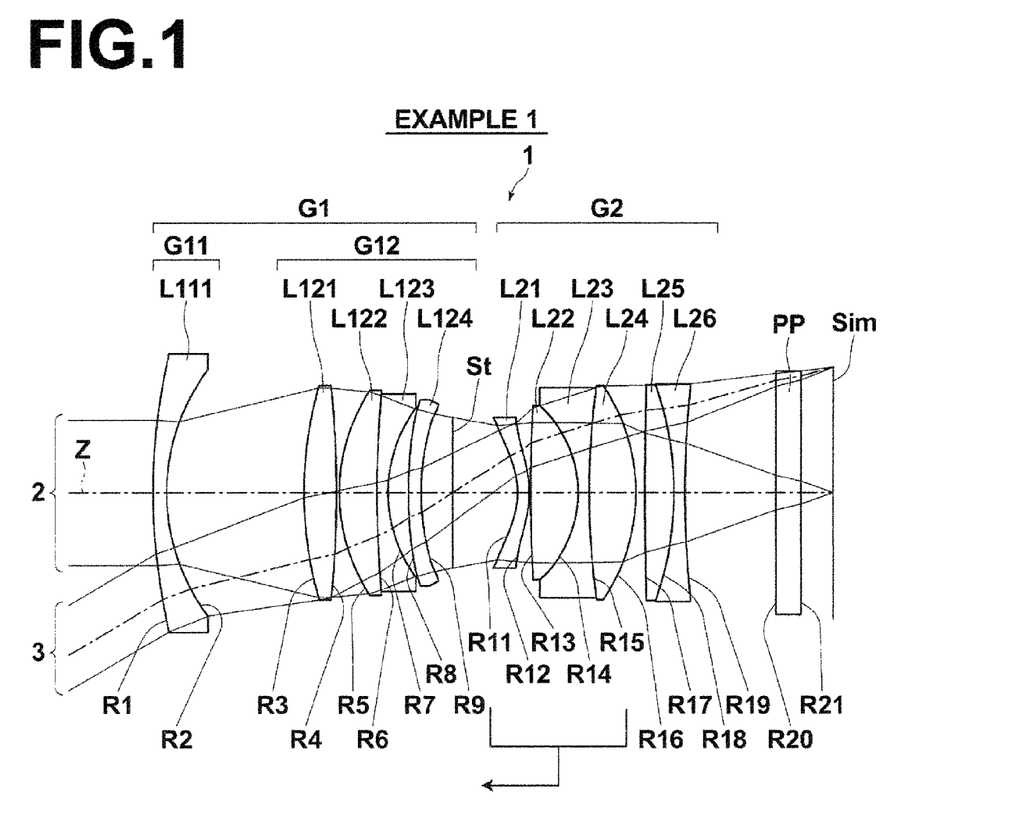
FIG. 1 is a cross-sectional view of an imaging lens according to Example 1 of the present invention, illustrating the lens configuration thereof.

Hereinafter, embodiments of the present invention will be described in detail with reference to the accompanying drawings. FIG. 1 is a cross-sectional view of an imaging lens according to an embodiment of the present invention, illustrating an example of a configuration thereof, which corresponds to the imaging lens of Examples 1 to be described later. Each of FIGS. 2 through 5 is a cross-sectional view of another example of a configuration according to an embodiment of the present invention, which corresponds to each of the imaging lenses of Examples 2 through 5 to be described later. The basic configurations illustrated in FIGS. 1 through 5 are all the same, and the manners in which the configurations are illustrated are also the same, except that the numbers of constituting lenses are different between two groups. Therefore, the imaging lenses according to the embodiments of the present invention will be described mainly with reference to FIG. 1.

FIG. 1 shows the arrangement of the optical system in a state focused on infinity, the left side being designated as the object side and the right side being designated as the image side. Moreover, FIG. 1 shows optical paths of an on-axis light beam 2 and a light beam 3 having a maximum angle of view from an object point at an infinite distance. The same applies to FIGS. 2 through 5.

The imaging lens of the present embodiments substantially consists of a first lens group G1 having positive refractive power and a second lens group G2 having positive refractive power in this order from the object side as lens groups. Note that an aperture stop St is disposed between the first lens group G1 and the second lens group G2.

The first lens group G1 is composed of an eleventh lens group G11 and a twelfth lens group G12, in this order from the object side, with a largest air space therebetween.

The eleventh lens group G11 has negative refractive power, and substantially consists of at least one negative lens (a lens having negative refractive power). The eleventh lens group G11 substantially consists of one negative lens L111 in the present embodiments.

The eleventh lens group G11 has the same configuration as well for Examples 2 and 5 to be described later. In contrast, the eleventh lens group G11 substantially consists of two lenses L111 and L112 with concave surfaces toward the image side, having negative refractive power in Examples 3 and 4.

The twelfth lens group G12 has positive refractive power, and substantially consists of one positive lens, one positive lens with a convex surface toward the object side, and one negative lens with a concave surface toward the image side in this order from the object side, those are adjacent to each other. In the present embodiments, the twelfth lens group G12 substantially consists of one positive lens L121; a cemented lens formed by cementing one positive lens L122 with a convex surface toward the object side and one negative lens L123 with a concave surface toward the image side; and a negative meniscus lens L124 with a convex surface toward the object side, both surfaces being aspheric; in this order from the object side.

The twelfth lens group G12 has the same configuration as well for Example 2 to be described later. In contrast, the lens L124 is a positive meniscus lens with a convex surface toward the object side, both surfaces being aspheric, in Examples 3 and 4. The twelfth lens group G12 substantially consists of one biconcave lens L121, one positive lens L122, one positive lens L123 with a convex surface toward the object side, and a cemented lens formed by cementing a biconvex lens L124 and a biconcave lens L125, in this order from the object side in Example 5.

The second lens group G2 substantially consists of an aspheric lens having at least one aspheric surface, and a three-cemented lens formed by cementing a positive lens, a negative lens, and a positive lens in this order from the object side, in this order from the object side. In the present embodiments, the second lens group G2 substantially consists of, in this order from the object side, a lens L21 having both surfaces being aspheric; a three-cemented lens formed by cementing a positive lens L22 with a convex surface toward the image side, a negative lens L23, and a positive lens L24 with a convex surface toward the image side in this order; and a cemented lens formed by cementing a biconvex lens L25 and a biconcave lens L26 in this order.

Note that the second lens group G2 has the same configuration as well in Example 2 to be described later. In contrast, the cemented lens formed by cementing a biconvex lens L25 and a biconcave lens L26 in this order is substituted by one negative meniscus lens L25 with a convex surface toward the image side in Example 3. In Example 4, the cemented lens formed by cementing a biconvex lens L25 and a biconcave lens L26 in this order is substituted by one biconcave lens L25. In Example 5, the cemented lens formed by cementing a biconvex lens L25 and a biconcave lens L26 in this order is substituted by a cemented lens formed by cementing a positive meniscus lens L25 with a convex surface toward the image side and a biconcave lens L26 in this order.

Note that the aperture stop St shown in FIG. 1 does not necessarily represent the size nor shape thereof, but a position on the optical axis Z. Sim shown therein is an image formation plane, and an imaging element, such as a CCD (Charge Coupled Device), a CMOS (Complementary Metal Oxide Semiconductor), or the like is disposed at the position as described below.

FIG. 1 shows an example in which a parallel plate optical member PP is disposed between the second lens group G2 and the image formation plane Sim. In the case that the imaging lens is applied to the imaging apparatus, a cover glass, various types of filters, such as a low-pass filter, an infrared cut filter, and the like are usually disposed between the optical system and the image formation plane Sim according to the configuration of the imaging apparatus side on which the imaging lens is mounted. The above optical member PP is supposed to be them.

Note that in the imaging lens of the present embodiments, focus adjustment is performed by fixing the cemented lens formed by cementing the lens L25 and the lens L26, which are disposed on the image side of the three-cemented lens, in the second lens group G2, and by moving only the lens L21 and the three-cemented lens of the second lens group G2 along the optical axis Z. In this case, the cemented lens formed by the lens L25 and the lens L26, which are fixed during focus adjustment, has negative refractive power. Note that focus adjustment is also performed by moving the lens L21 and the three-cemented lens of the second lens group G2 along the optical axis Z in Examples 2, 4, and 5 to be described later. One lens L25 which is fixed during focus adjustment has negative refractive power in Examples 4 and 5. In contrast, in Example 3, focus adjustment is performed by moving the entire second lens group G2 along the optical axis Z.

In the imaging lens of the present embodiments, a first lens group G1 having positive refractive power, an aperture stop, and a second lens group G2 having positive refractive power are arranged in this order from the object side; and a lens configuration provided by the first lens group G1 and the second lens group G2 is appropriately set. Thereby, the imaging lens can be fast, having a short entire length, a large diameter and high optical performance as well as achieving favorable correction of various aberrations such as spherical aberration and chromatic aberration.

In particular, the twelfth lens group G12, in which one positive lens L121, one positive lens L122 with a convex surface toward the object side, and one negative lens L123 with a concave surface toward the image side are arranged adjacent to each other in this order from the object side, is disposed on the object side of the aperture stop St. This is advantageous from the viewpoint from a large diameter and a fast lens can be obtained.

By configuring the eleventh lens group G11 disposed on the object side of the twelfth lens group G12 to be at least one negative lens L111, a wider angle can be achieved. Particularly, by configuring the eleventh lens group G11 to substantially consist of two negative lenses L111 and L112, negative power can be dispersed into two lenses and correction of spherical aberration and field curvature will be facilitated.

By disposing an aspheric lens L21 having at least one aspheric surface and a three-cemented lens formed by cementing a positive lens L22, a negative lens L23, and a positive lens L24 in this order from the object side on the image side of the aperture stop St, spherical aberration can be favorably corrected by the aspheric lens and longitudinal chromatic aberration and lateral chromatic aberration can be favorably corrected by the three-cemented lens.

By configuring this three-cemented lens to substantially consist of a positive lens L22 with a convex surface toward the image side, a negative lens L23, and a positive lens L24 with a convex surface toward the image side, an off-axis light beam having a large angle of view can be prevented from being greatly refracted at each surface and the amount of occurrence of aberrations can be suppressed, while the absolute value of radius of curvature is small.

As focus adjustment is performed by moving only the lens L21 and the three-cemented lens of the second lens group G2 along the optical axis Z, variations in spherical aberration and field curvature during focus adjustment can be suppressed by a lens or lenses disposed on the image side of the three-cemented lens. The weight of lenses which move can be reduced by fixing the first lens group G1 during focus adjustment, thereby enabling improvement of the focus speed. Moreover, by making lenses or a lens group which remains fixed during focus adjustment have negative refractive power in the second lens group G2, aberration variations can be reduced while adjusting focus.

It is preferable for the imaging lens of the present embodiments to have the above configuration and satisfy conditional expression (1) below:

$$Nd2 > 1.8 \quad (1).$$

where,
Nd2: the average value of the refractive index with respect to the d-line of the materials of positive lenses L22 and L24 of the three-cemented lens included in the second lens group G2.

By satisfying conditional expression (1), spherical aberration can be prevented from increasing, the burden of correction of spherical aberration imposed on the aspheric lens L21 can be reduced, and field curvature and spherical aberration can be favorably corrected.

It is preferable for the imaging lens of the present embodiments to satisfy conditional expression (2) below:

$$Nd12a > 1.8 \quad (2).$$

where,
Nd12a: the refractive index with respect to the d-line of the material of a positive lens or lenses having the highest refractive index with respect to the d-line in the twelfth lens group.

Note that a positive lens having the highest refractive index with respect to the d-line in the twelfth lens group G12 refers to lenses L121 and L122 in Examples 1 and 2 to be described later, refers to a lens L121 in Examples 3 and 4, and refers to lenses L122 and L124 in Example 5.

By satisfying conditional expression (2), spherical aberration can be prevented from increasing, the burden of correction of spherical aberration imposed on the aspheric lens L21 can be reduced and field curvature and spherical aberration can be favorably corrected.

It is preferable for the imaging lens of the present embodiments to satisfy conditional expressions (3) and (4) below:

$$0 < \theta gF12b - 0.6415 + 0.001618 \times vd12b \quad (3), \text{ and}$$

$$vd12b < 35 \quad (4).$$

where,
vd12b: the Abbe number with respect to the d-line of the material of one lens L12b of positive lenses included in the twelfth lens group, and
θgF12b: a partial dispersion ratio between the g-line and the F-line with respect to the material of one lens L12b of positive lenses included in the twelfth lens group.

Note that the partial dispersion ratio egF between the g-line and the F-line with respect to a lens is defined by the formula: θgF=(Ng−NF)/(NF−NC) in the case that refractive indices with respect to the g-line, the F-line, and the C-line of the lens are respectively designated as Ng, NF, and NC. Moreover, the lens L12b refers to a lens L122 in Examples 1 through 5.

By satisfying conditional expressions (3) and (4), a secondary spectrum of longitudinal chromatic aberration in particular can be favorably corrected.

It is preferable for the imaging lens of the present embodiments to satisfy conditional expression (5) below:

$$vd2p - vd2n > 5 \quad (5).$$

where,
vd2p: the Abbe number of the material of a lens having a larger Abbe number with respect to the d-line of two positive lenses L22 and L24 within the three-cemented lens in the second lens group G2, and
vd2n: the Abbe number with respect to the d-line of the material of a negative lens L23 of the three-cemented lens in the second lens group G2.

By satisfying conditional expression (5), the differences in spherical aberrations due to wavelengths can be prevented from increasing, and longitudinal chromatic aberration and lateral chromatic aberration in particular can be favorably corrected.

In order to further enhance the advantageous effects obtained in the case conditional expressions (1) through (4) described above are respectively satisfied, it is more preferable for conditional expressions (1-1) through (4-1) below to be respectively satisfied, instead of conditional expressions (1) through (4):

$$Nd2 > 1.85 \quad (1\text{-}1)$$

$$Nd12a > 1.85 \quad (2\text{-}1)$$

$$0.012 < \theta gF12b - 0.6415 + 0.001618 \times vd12b \quad (3\text{-}1), \text{ and}$$

$$vd12b < 27 \quad (4\text{-}1).$$

Note that the imaging lens of the present invention can selectively adopt one or arbitrary combinations of the preferred embodiments described above as appropriate. Moreover, the imaging lens of the present invention may be equipped with a light shielding means which suppresses the occurrence of flares, various kinds of filters between the lens system and the image formation plane Sim, and the like, although not shown in FIGS. 1 through 5.

Next, Examples of the imaging lens of the present invention, particularly Numerical Examples will be described in detail.

Example 1

FIG. 1 illustrates an arrangement of the lens groups in the imaging lens of Example 1. Note that since a detailed description of the lens groups and the respective lenses in the configuration of FIG. 1 has already been given, redundant descriptions will be omitted unless particularly necessary.

Table 1 shows basic lens data of the imaging lens of Example 1. The optical member PP is also shown therein. In Table 1, i-th (i=1, 2, 3, . . . ) surface numbers, the value of i sequentially increasing from the surface of the constituent element at the most-object side, which is designated as 1, toward the image side, are shown in the column Si. The radii of curvature of i-th surfaces are shown in the column Ri, and distances between i-th surfaces and (i+1)st surfaces along the optical axis Z1 are shown in the column Di. Further, the refractive indices of j-th (j=1, 2, 3, . . . ) constituent elements with respect to the d-line (wavelength: 587.6 nm), the value of j sequentially increasing from the constituent element at the most object side, which is designated as 1, toward the image side, are shown in the column Ndj. The Abbe numbers of j-th constituent elements with respect to the d-line are shown in the column νdj. The column θgFj shows a partial dispersion ratio of i-th constituent element. An aperture stop St is also represented in the basic lens data, and the mark "∞" is indicated in the column of radius of curvature of the surface corresponding to the aperture stop.

mm is used as the unit of values of radius of curvature R and the distance between surfaces D is mm in Table 1. Further, values rounded to a predetermined digit are shown in Table 1. The sign of radius of curvature is positive in the case that a surface shape is convex on the object side, and negative in the case that the surface shape is convex on the image side. In the basic lens data of Table 1, an asterisk mark * is attached to the surface number of each of aspheric surfaces and values of paraxial radii of curvature are shown as the radii of curvature of the aspheric surfaces. The manner in which Table 1 is shown as described above is the same for Tables 3, 5, 7, and 9 to be described below.

Table 2 shows data regarding the aspheric surface of the imaging lens of Example 1. Surface numbers of aspheric surfaces and aspheric surface coefficients with respect to the aspheric surfaces are shown therein. Note that "E-n" (n: integer) in each of the numerical values of the aspheric surface coefficients means "×10$^{-n}$". The aspheric surface coefficients are the values of respective coefficients K, A, Am (m=3, 4, 5 ... 10) in the aspheric surface formula below:

$$Zd = C \cdot h^2 / \{1 + (1 - KA \cdot C^2 \cdot h^2)^{1/2}\} + \Sigma Am \cdot h^m$$

where,
Zd: the depth of an aspheric surface (the length of a perpendicular line drawn from a point on an aspheric surface with a height h to a plane perpendicular to the optical axis which contacts the peak of the aspheric surface)
h: height (the distance from the optical axis to a lens surface)
C: the reciprocal of a paraxial radius of curvature
KA, Am: aspheric surface coefficients (m=3, 4, 5, ... 10)
The manner in which Table 2 is shown as described above is the same for Tables 4, 6, 8, and 10 to be described below.

Table 11 to be shown below represents specs of the imaging lens of Example 1 and corresponding values of conditional expressions (1) through (5) together with those of the other Examples 2 through 5.

In each of Tables below, mm is used as the unit of length and degree is used as the unit of angle as described above, but other appropriate units may also be used, as optical systems are usable even when they are proportionally increased or decreased.

TABLE 1

Example 1 Basic Lens Data

| Si | Ri | Di | Ndj | νdj | θgFj |
|---|---|---|---|---|---|
| 1 | 71.180 | 1.50 | 1.92286 | 20.9 | |
| 2 | 23.570 | 15.20 | | | |
| 3 | 45.210 | 3.55 | 1.88300 | 40.8 | |
| 4 | −120.400 | 0.30 | | | |
| 5 | 21.600 | 4.15 | 1.88300 | 40.8 | 0.5667 |
| 6 | 131.000 | 1.21 | 1.48749 | 70.2 | |
| 7 | 16.450 | 2.24 | | | |
| *8 | 50.140 | 1.40 | 1.58313 | 59.5 | |
| *9 | 27.770 | 3.49 | | | |
| 10 (St) | ∞ | 7.16 | | | |
| *11 | −9.043 | 1.30 | 1.80610 | 40.7 | |
| *12 | −11.720 | 0.15 | | | |
| 13 | 186.900 | 5.22 | 1.88300 | 40.8 | |
| 14 | −13.530 | 1.22 | 1.80810 | 22.8 | |
| 15 | 88.270 | 5.21 | 1.88300 | 40.8 | |
| 16 | −21.820 | 1.00 | | | |
| 17 | 665.400 | 3.15 | 1.49700 | 81.6 | |
| 18 | −37.660 | 1.21 | 1.67270 | 32.1 | |
| 19 | 124.900 | 10.00 | | | |
| 20 | ∞ | 2.80 | 1.51680 | 64.2 | |
| 21 | ∞ | | | | |

TABLE 2

Example 1 Aspheric Surface Coefficients

| | Si | | | |
|---|---|---|---|---|
| | 8 | 9 | 11 | 12 |
| K | 0.0000000E+00 | 0.0000000E+00 | 0.0000000E+00 | 0.0000000E+00 |
| A3 | 8.8657152E−05 | −1.7964702E−04 | 3.3011939E−04 | 5.7030623E−04 |
| A4 | −6.9461047E−05 | 2.1184487E−04 | 4.0248958E−06 | −1.7378335E−04 |
| A5 | −1.6846379E−06 | −2.0128175E−04 | 3.5023244E−05 | 1.4004636E−04 |
| A6 | 3.4045787E−06 | 9.1493026E−05 | 5.8298688E−05 | 3.7630099E−05 |
| A7 | 2.4802865E−06 | −1.8876341E−05 | −2.8949301E−05 | −3.9903923E−05 |
| A8 | −1.8470155E−06 | −7.5690311E−07 | 5.6302173E−07 | 1.0044095E−05 |
| A9 | 3.8669115E−07 | 1.2015070E−06 | 3.0292236E−06 | 2.5474873E−07 |
| A10 | 9.3593405E−09 | −1.8089335E−07 | −7.2911416E−07 | −5.9452307E−07 |
| A11 | −1.5785841E−08 | −1.4496566E−08 | −3.4146252E−08 | 9.1716911E−08 |
| A12 | 1.8266379E−09 | 6.3911776E−09 | 3.4124384E−08 | 5.6348979E−09 |
| A13 | 1.3548276E−10 | −2.8942203E−10 | −2.9036243E−09 | −2.9943568E−09 |
| A14 | −4.1663721E−11 | −8.3620150E−11 | −5.1469176E−10 | 2.1484568E−10 |
| A15 | 1.4705013E−12 | 9.2415725E−12 | 9.1574265E−11 | 2.5777228E−11 |
| A16 | 2.9651895E−13 | 3.2554144E−13 | 8.7369816E−13 | −4.8269646E−12 |
| A17 | −2.6470811E−14 | −8.5018383E−14 | −9.4537976E−13 | 1.3921545E−13 |
| A18 | −2.6711679E−16 | 1.5598631E−15 | 3.5863177E−14 | 2.2740290E−14 |
| A19 | 1.0417649E−16 | 2.7388814E−16 | 3.1382126E−15 | −2.0876011E−15 |
| A20 | −3.2262424E−18 | −1.1804992E−17 | −1.8835785E−16 | 5.3965007E−17 |

Figure 6:
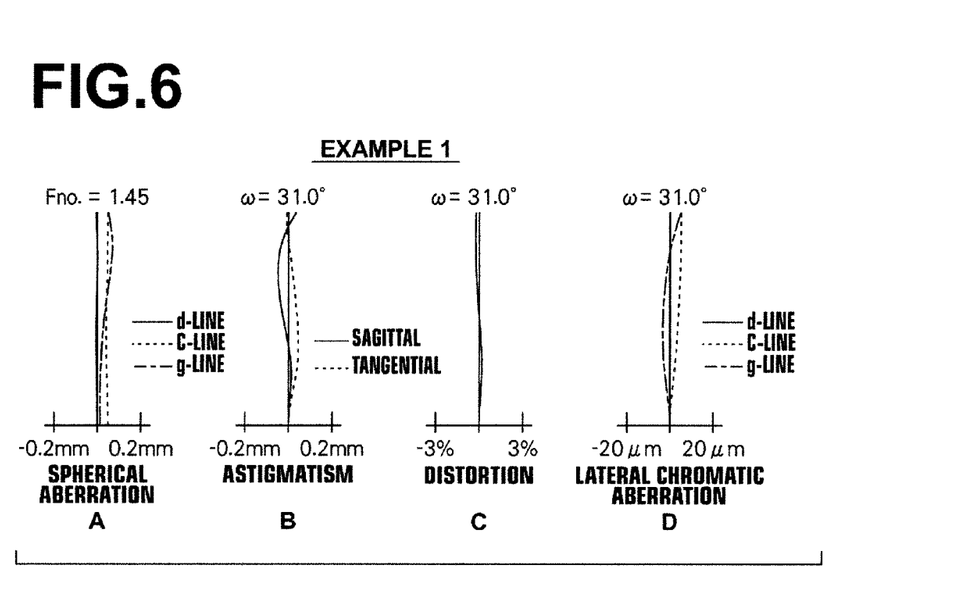
FIG. 6 shows aberration diagrams A through D of the imaging lens according to Example 1 of the present invention.
Figure 7:
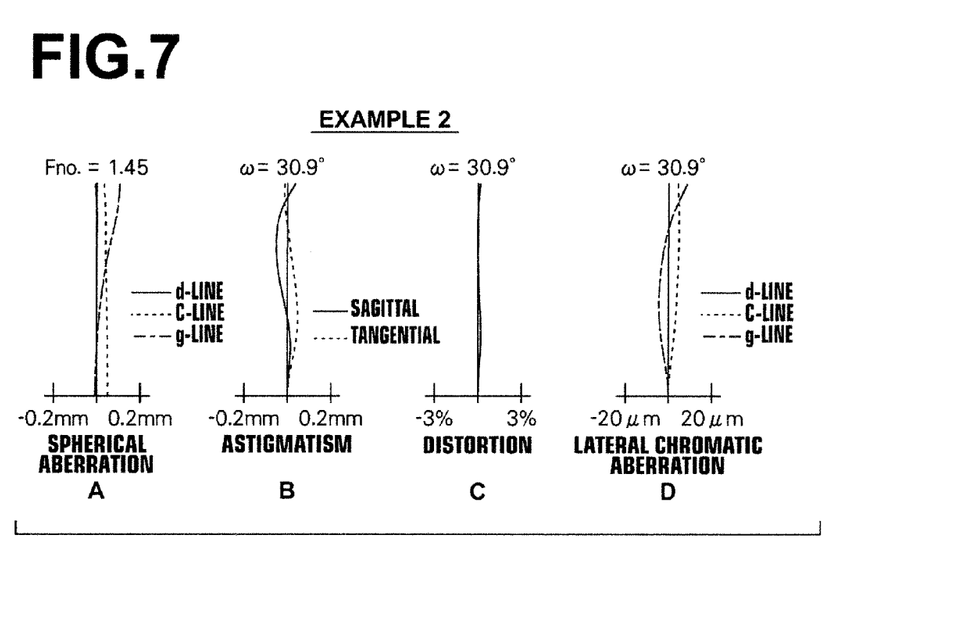
FIG. 7 shows aberration diagrams A through D of the imaging lens according to Example 2 of the present invention.
Figure 8:
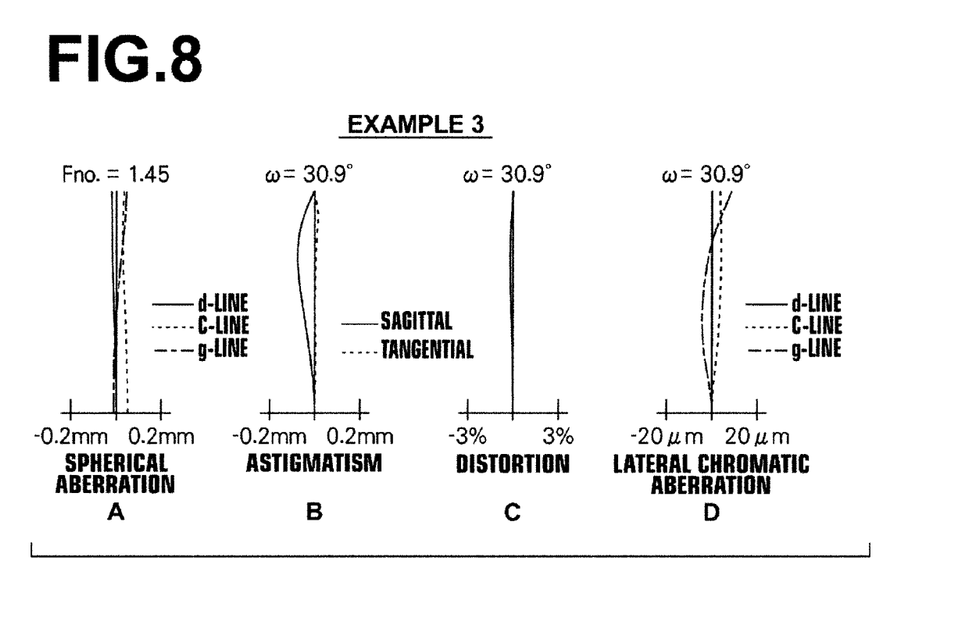
FIG. 8 shows aberration diagrams A through D of the imaging lens according to Example 3 of the present invention.
Figure 9:
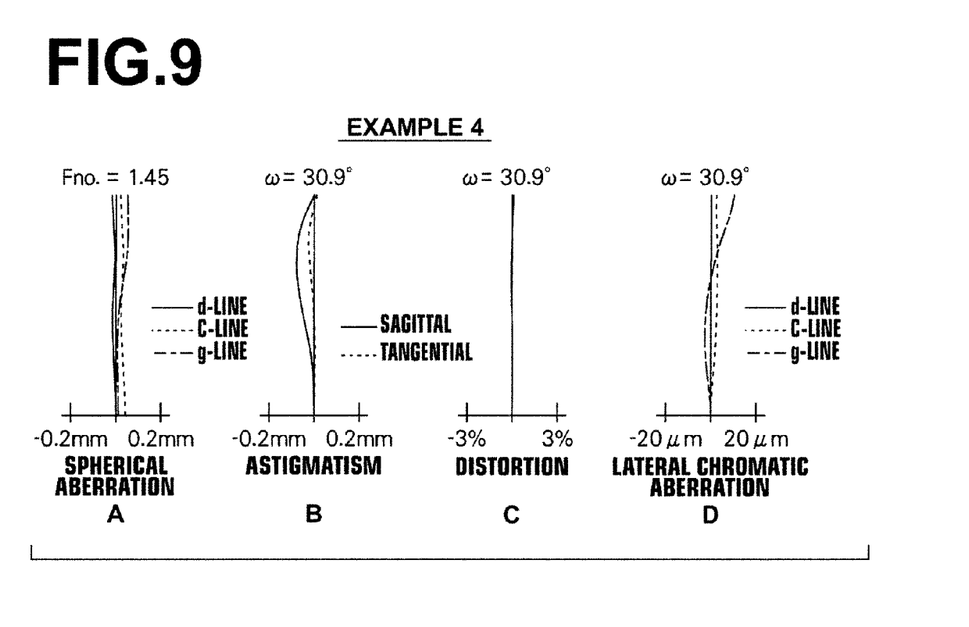
FIG. 9 shows aberration diagrams A through D of the imaging lens according to Example 4 of the present invention.
Figure 10:
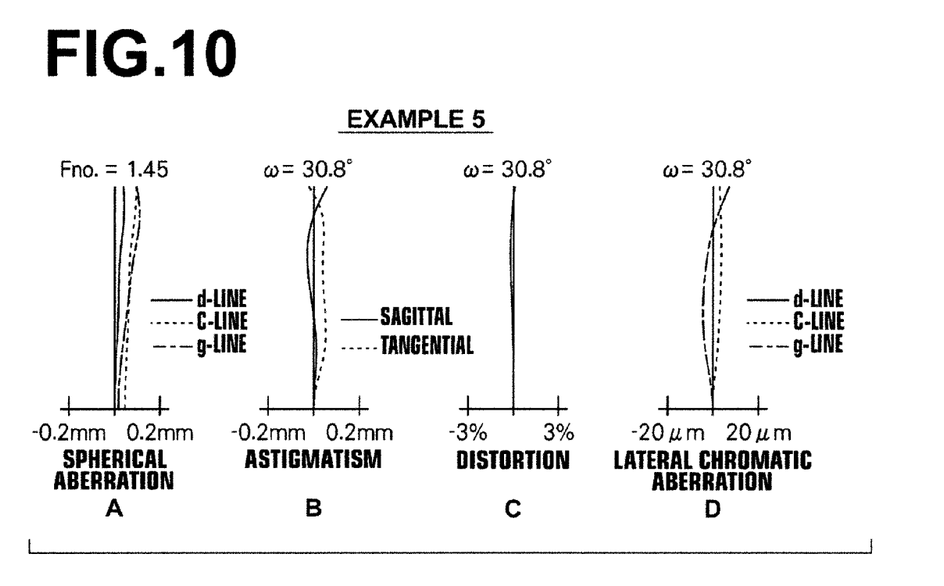
FIG. 10 shows aberration diagrams A through D of the imaging lens according to Example 5 of the present invention.

A through D of FIG. 6 respectively show spherical aberration, astigmatism, distortion, and lateral chromatic aberration of the imaging lens according to Example 1. Each of the aberration diagrams shows aberration with respect to the d-line (587.56 nm) as a reference wavelength. The spherical aberration diagram shows aberration with respect to a wavelength of 656.27 nm (the c-line) and aberration with respect to a wavelength of 435.83 nm (the g-line). The astigmatism diagram shows aberration in a sagittal direction with a solid line, and aberration in a tangential direction with a broken line. The lateral chromatic aberration diagram shows aberration with respect to the C-line and aberration with respect to the g-line. The sign Fno. of the spherical aberration diagram refers to an F-number, and the sign "ω" refers to a half angle of view. The manner in which aberrations are shown as described above is the same as in FIGS. 7 through 10 to be described below.

Example 2

Figure 2:
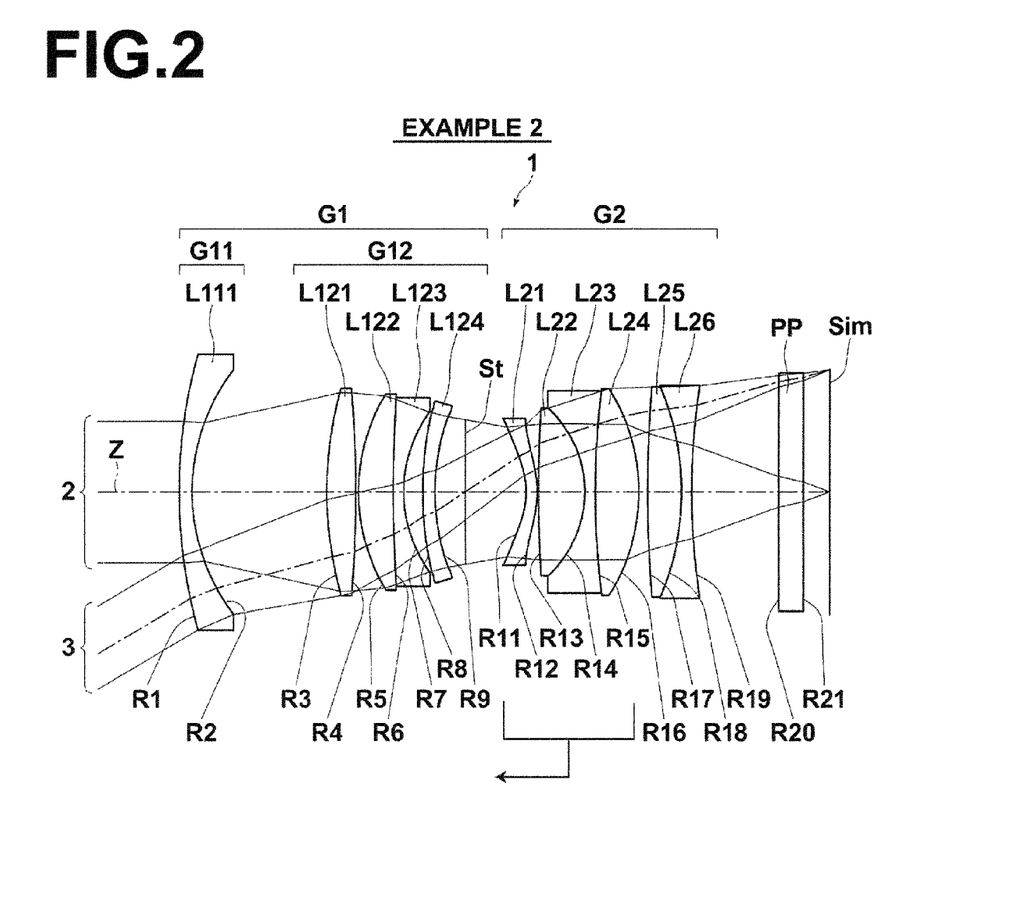
FIG. 2 is a cross-sectional view of an imaging lens according to Example 2 of the present invention, illustrating the lens configuration thereof.

FIG. 2 shows an arrangement of lens groups in the imaging lens of Example 2. The imaging lens of Example 2 has substantially the same configuration as that of the imaging lens of Example 1 described above.

The basic lens data of the imaging lens of Example 2 is shown in Table 3, and data with respect to aspheric surface of the imaging lens of Example 2 is shown in Table 4. A through D of FIG. 7 respectively show aberration diagrams of the imaging lens of Example 2.

TABLE 3

Example 2 Basic Lens Data

| Si | Ri | Di | Ndj | vdj | θgFj |
|---|---|---|---|---|---|
| 1 | 60.029 | 1.50 | 1.92286 | 20.9 | |
| 2 | 23.458 | 15.56 | | | |
| 3 | 45.564 | 3.37 | 1.88300 | 40.8 | |
| 4 | −141.923 | 0.30 | | | |
| 5 | 21.932 | 4.03 | 1.88300 | 40.8 | 0.5667 |
| 6 | 175.645 | 1.21 | 1.48749 | 70.2 | |
| 7 | 16.192 | 2.16 | | | |
| *8 | 38.858 | 1.40 | 1.58313 | 59.5 | |
| *9 | 23.893 | 3.47 | | | |
| 10 (St) | ∞ | 7.00 | | | |
| *11 | −9.250 | 1.30 | 1.80610 | 40.7 | |

TABLE 3-continued

Example 2 Basic Lens Data

| Si | Ri | Di | Ndj | vdj | θgFj |
|---|---|---|---|---|---|
| *12 | −12.253 | 0.15 | | | |
| 13 | 166.979 | 5.32 | 1.88300 | 40.8 | |
| 14 | −13.250 | 1.22 | 1.80810 | 22.8 | |
| 15 | 96.901 | 5.03 | 1.88300 | 40.8 | |
| 16 | −22.459 | 1.00 | | | |
| 17 | 154.164 | 3.93 | 1.49700 | 81.6 | |
| 18 | −31.532 | 1.21 | 1.59551 | 39.2 | |
| 19 | 83.400 | 10.00 | | | |
| 20 | ∞ | 2.80 | 1.51680 | 64.2 | |
| 21 | ∞ | | | | |

TABLE 4

Example 2 Aspheric Surface Coefficients

| | Si | | | |
|---|---|---|---|---|
| | 8 | 9 | 11 | 12 |
| K | 0.0000000E+00 | 0.0000000E+00 | 0.0000000E+00 | 0.0000000E+00 |
| A3 | 4.4789414E−05 | −1.8199505E−04 | 3.8524160E−04 | 5.3950742E−04 |
| A4 | −5.6156146E−05 | 1.3361861E−04 | −4.1965585E−05 | −8.1929323E−05 |
| A5 | −4.1295918E−05 | −1.6333324E−04 | 6.5727835E−05 | 7.3385394E−05 |
| A6 | 2.3891806E−05 | 7.8991714E−05 | 5.5630509E−05 | 6.3273868E−05 |
| A7 | −2.8511890E−06 | −1.9064514E−05 | −3.1288010E−05 | −4.2574766E−05 |
| A8 | −1.7014671E−06 | 3.2932208E−07 | 8.8527376E−07 | 8.8416035E−06 |
| A9 | 6.6869374E−07 | 1.0272231E−06 | 3.2480529E−06 | 6.0808674E−07 |
| A10 | −4.8321472E−08 | −2.0794882E−07 | −7.9361355E−07 | −5.9309720E−07 |
| A11 | −1.7371737E−08 | −5.6838309E−09 | −3.7619234E−08 | 8.0755737E−08 |
| A12 | 3.5282654E−09 | 6.4357877E−09 | 3.7574953E−08 | 6.3776947E−09 |
| A13 | 1.6648380E−11 | −4.7842118E−10 | −3.1680640E−09 | −2.8247127E−09 |
| A14 | −6.0182072E−11 | −7.5146024E−11 | −5.8209765E−10 | 1.9898867E−10 |
| A15 | 4.0446370E−12 | 1.1344431E−11 | 1.0219798E−10 | 2.3822254E−11 |
| A16 | 3.4307479E−13 | 1.7442979E−13 | 1.2220569E−12 | −4.6532719E−12 |
| A17 | −4.6689975E−14 | −9.6683719E−14 | −1.0871487E−12 | 1.5913901E−13 |
| A18 | 2.1442870E−16 | 2.6096248E−15 | 3.9646013E−14 | 2.1175841E−14 |
| A19 | 1.6074487E−16 | 2.9995755E−16 | 3.7878125E−15 | −2.1899726E−15 |
| A20 | −5.7374380E−18 | −1.4521623E−17 | −2.2357412E−16 | 6.2161425E−17 |

Example 3

Figure 3:
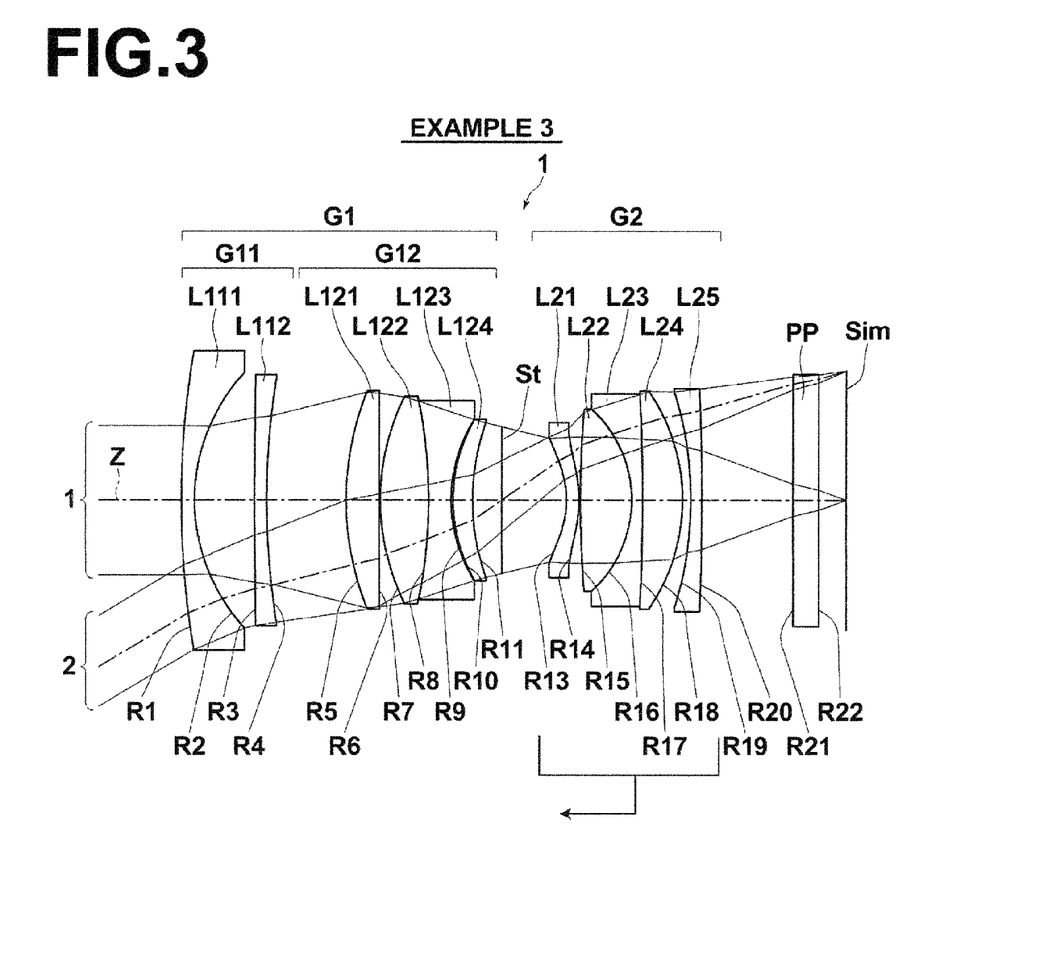
FIG. 3 is a cross-sectional view of an imaging lens according to Example 3 of the present invention, illustrating the lens configuration thereof.

FIG. 3 shows an arrangement of the lens groups in the imaging lens of Example 3. The imaging lens of Example 3 has substantially the same configuration as that of the imaging lens of Example 1 described above, but differs from Example 1 in that the eleventh lens group G11 substantially consists of two lenses L111 and L112 having negative refractive power with a concave surface toward the image side; that the twelfth lens group G12 substantially consists of a positive meniscus lens L124 with a convex surface toward the object side, instead of an aspheric lens L124; that the second lens group G2 substantially consists of one negative meniscus lens L25 with a convex surface toward the image side, instead of a cemented lens formed by cementing a biconvex lens L25 and a biconcave lens L26 in this order; and that focus adjustment is performed by moving the entire second lens group G2 along the optical axis Z. Note that the differences from Example 1 with respect to the eleventh lens group G11 and with respect to the twelfth lens group G12 are the same for Example 4 to be described later, and these differences will not be described again.

Table 5 shows basic lens data of the imaging lens of Example 3, and Table 6 shows data with respect to aspheric surfaces of the imaging lens of Example 3. A through D of FIG. 8 respectively illustrate aberration diagrams of the imaging lens of Example 3.

TABLE 5

Example 3 Basic Lens Data

| Si | Ri | Di | Ndj | vdj | θgFj |
|---|---|---|---|---|---|
| 1 | 100.840 | 1.42 | 1.51742 | 52.4 | |
| 2 | 20.912 | 6.55 | | | |
| 3 | 833.382 | 1.30 | 1.59270 | 35.3 | |
| 4 | 86.332 | 8.69 | | | |
| 5 | 32.599 | 3.59 | 2.00069 | 25.5 | 0.6133 |
| 6 | 1515.986 | 0.15 | | | |
| 7 | 25.975 | 5.28 | 1.88300 | 40.8 | |
| 8 | −53.990 | 2.47 | 1.80810 | 22.8 | |
| 9 | 16.687 | 0.22 | | | |
| 10 | 17.859 | 2.15 | 1.71300 | 53.9 | |
| 11 | 25.594 | 3.19 | | | |
| 12 (St) | ∞ | 7.00 | | | |
| *13 | −9.523 | 1.38 | 1.80610 | 40.7 | |
| *14 | −13.158 | 0.15 | | | |
| 15 | 133.058 | 5.58 | 1.88300 | 40.8 | |
| 16 | −13.512 | 1.22 | 1.75211 | 25.1 | |
| 17 | −206.935 | 4.32 | 1.88300 | 40.8 | |
| 18 | −21.298 | 0.90 | | | |
| 19 | −40.269 | 1.20 | 1.51742 | 52.4 | |
| 20 | −268.832 | 10.00 | | | |
| 21 | ∞ | 2.80 | 1.51680 | 64.2 | |
| 22 | ∞ | | | | |

TABLE 6

Example 3 Aspheric Surface Coefficients

| | Si | |
|---|---|---|
| | 13 | 14 |
| K | 1.0842400E−01 | 7.8812300E−02 |
| A3 | 2.2484116E−04 | 7.9529720E−05 |
| A4 | 2.5336600E−05 | 5.1055668E−04 |
| A5 | 2.1774318E−04 | −4.2887210E−04 |
| A6 | −1.0404907E−04 | 3.7956223E−04 |
| A7 | 3.0501999E−05 | −1.7049288E−04 |
| A8 | −4.6541104E−06 | 3.5448024E−05 |
| A9 | −1.2296253E−07 | 1.1537504E−06 |
| A10 | 2.2245649E−07 | −2.3009846E−06 |
| A11 | −4.4198888E−08 | 4.2366052E−07 |
| A12 | 2.0652285E−09 | 6.9515088E−09 |
| A13 | 6.0580937E−10 | −1.2405806E−08 |
| A14 | −1.1140225E−10 | 1.3339079E−09 |
| A15 | 5.7988450E−12 | 7.2519906E−11 |
| A16 | 2.8469167E−13 | −2.4174340E−11 |
| A17 | −5.9117810E−14 | 1.2073702E−12 |
| A18 | 5.0535535E−15 | 8.9801447E−14 |
| A19 | −3.2461844E−16 | −1.1416432E−14 |
| A20 | 1.0459292E−17 | 3.3888041E−16 |

Example 4

Figure 4:
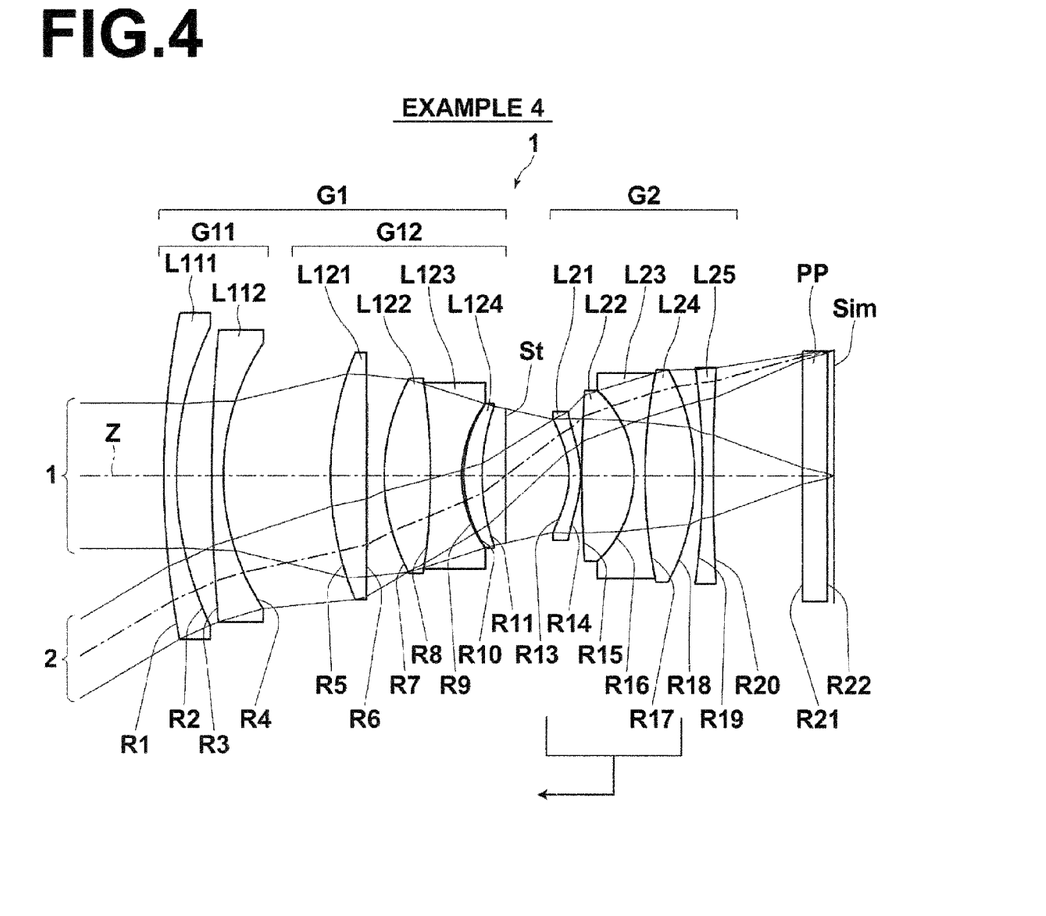
FIG. 4 is a cross-sectional view of an imaging lens according to Example 4 of the present invention, illustrating the lens configuration thereof.

FIG. 4 shows an arrangement of the lens groups in the imaging lens of Example 4. The imaging lens of Example 4 has substantially the same configuration as that of the imaging lens of Example 3 described above, but differs from Example 3 in that the second lens group G2 substantially consists of a biconcave lens L25, instead of a negative meniscus lens L25 with a convex surface toward the image side.

Table 7 shows basic lens data of the imaging lens of Example 4, and Table 8 shows data with respect to aspheric surfaces of the imaging lens of Example 4. A through D of FIG. 9 respectively illustrate aberration diagrams of the imaging lens of Example 4.

TABLE 7

Example 4 Basic Lens Data

| Si | Ri | Di | Ndj | vdj | θgFj |
|---|---|---|---|---|---|
| 1 | 96.198 | 1.42 | 1.48749 | 70.2 | |
| 2 | 39.135 | 4.00 | | | |
| 3 | 181.440 | 1.30 | 1.61293 | 37.0 | |
| 4 | 27.399 | 11.93 | | | |
| 5 | 36.435 | 4.08 | 2.00069 | 25.5 | 0.6133 |
| 6 | −1126.300 | 1.94 | | | |
| 7 | 22.894 | 5.15 | 1.88300 | 40.8 | |
| 8 | −76.171 | 3.50 | 1.80810 | 22.8 | |
| 9 | 13.753 | 0.25 | | | |
| 10 | 14.851 | 2.06 | 1.71300 | 53.9 | |
| 11 | 23.690 | 2.65 | | | |
| 12 (St) | ∞ | 7.13 | | | |
| *13 | −8.922 | 1.27 | 1.80348 | 40.4 | |
| *14 | −11.386 | 0.15 | | | |
| 15 | 155.260 | 5.81 | 1.88300 | 40.8 | |
| 16 | −13.316 | 1.21 | 1.68893 | 31.1 | |
| 17 | 59.524 | 5.56 | 1.88300 | 40.8 | |
| 18 | −25.586 | 0.90 | | | |
| 19 | −91.051 | 1.20 | 1.80810 | 22.8 | |
| 20 | 249.640 | 10.00 | | | |
| 21 | ∞ | 2.80 | 1.51680 | 64.2 | |
| 22 | ∞ | | | | |

TABLE 8

Example 4 Aspheric Surface Coefficients

| | Si | |
|---|---|---|
| | 13 | 14 |
| K | 1.0000000E−01 | 1.0000000E−01 |
| A3 | 1.6085859E−04 | −3.8031887E−05 |
| A4 | 3.1604165E−04 | 9.1351152E−04 |
| A5 | 1.3528598E−04 | −6.7979931E−04 |
| A6 | −1.9524496E−04 | 4.1157887E−04 |
| A7 | 8.4990030E−05 | −1.4922693E−04 |
| A8 | −5.8469037E−06 | 2.7143660E−05 |
| A9 | −5.8141716E−06 | 1.5049108E−06 |
| A10 | 1.2818564E−06 | −1.9425352E−06 |
| A11 | 1.8591384E−07 | 3.5630785E−07 |
| A12 | −8.3124906E−08 | 4.2682107E−09 |
| A13 | 2.8662325E−10 | −1.0368272E−08 |
| A14 | 2.7277112E−09 | 1.1746916E−09 |
| A15 | −2.2027007E−10 | 5.4804383E−11 |
| A16 | −4.1473274E−11 | −2.0635550E−11 |
| A17 | 6.4318314E−12 | 1.1008282E−12 |
| A18 | 6.6823865E−14 | 7.1694592E−14 |
| A19 | −5.4568937E−14 | −9.6542271E−15 |
| A20 | 2.5445767E−15 | 2.8985477E−16 |

Example 5

Figure 5:
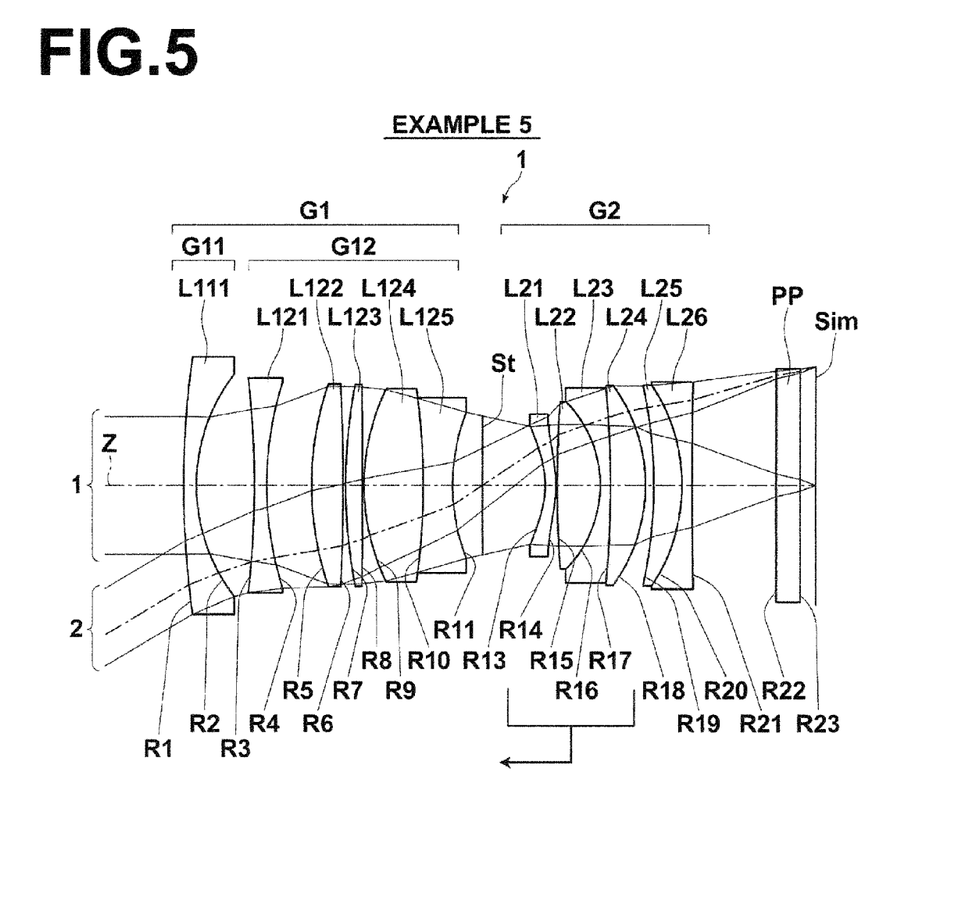
FIG. 5 is a cross-sectional view of an imaging lens according to Example 5 of the present invention, illustrating the lens configuration thereof.

FIG. 5 shows an arrangement of the lens groups in the imaging lens of Example 5. The imaging lens of Example 5 has substantially the same configuration as that of the imaging lens of Example 1 described above, but differs from Example 1 in that the twelfth lens group G12 substantially consists of one biconcave lens L121, one positive lens L122, one positive lens L123 with a convex surface toward the object side, and a cemented lens formed by cementing a biconvex lens L124 and a biconcave lens L125, in this order from the object side; and that the second lens group G2 substantially consists of a cemented lens formed by cementing a positive meniscus lens L25 with a convex surface toward the image side and a biconcave lens L26 in this order, instead of a cemented lens formed by cementing a biconvex lens L25 and a biconcave lens L26 in this order.

Table 9 shows basic lens data of the imaging lens of Example 5, and Table 10 shows data with respect to aspheric surfaces of the imaging lens of Example 5. A through D of FIG. 10 respectively illustrate aberration diagrams of the imaging lens of Example 3.

TABLE 9

Example 5 Basic Lens Data

| Si | Ri | Di | Ndj | vdj | θgFj |
|---|---|---|---|---|---|
| 1 | 113.654 | 1.50 | 1.51680 | 64.2 | |
| 2 | 21.837 | 6.91 | | | |
| 3 | −113.605 | 1.50 | 1.51680 | 64.2 | |
| 4 | 41.239 | 5.34 | | | |
| 5 | 38.235 | 3.71 | 1.88300 | 40.8 | 0.5667 |
| 6 | −250.212 | 0.30 | | | |
| 7 | 65.386 | 2.00 | 1.62041 | 60.3 | |
| 8 | −1417.002 | 0.20 | | | |
| 9 | 27.118 | 6.98 | 1.88300 | 40.8 | |
| 10 | −82.926 | 3.51 | 1.80810 | 22.8 | |
| 11 | 24.188 | 3.55 | | | |
| 12 (St) | ∞ | 7.44 | | | |
| *13 | −10.921 | 1.30 | 1.80610 | 40.7 | |
| *14 | −15.470 | 0.15 | | | |
| 15 | 162.144 | 5.12 | 1.88300 | 40.8 | |
| 16 | −14.134 | 1.22 | 1.75211 | 25.1 | |
| 17 | −124.649 | 4.14 | 1.88300 | 40.8 | |
| 18 | −20.466 | 1.00 | | | |
| 19 | −55.253 | 3.31 | 1.49700 | 81.6 | |
| 20 | −21.859 | 1.21 | 1.51742 | 52.4 | |
| 21 | 800.978 | 10.00 | | | |
| 22 | ∞ | 2.80 | 1.51680 | 64.2 | |
| 23 | ∞ | | | | |

TABLE 10

Example 5 Aspheric Surface Coefficients

| | Si | |
|---|---|---|
| | 13 | 14 |
| K | 1.0117680E−01 | 9.3782200E−02 |
| A3 | 1.8947884E−04 | −7.2691235E−05 |
| A4 | −1.4957505E−04 | 7.4831621E−04 |
| A5 | 4.0966060E−04 | −6.4099271E−04 |
| A6 | −1.8494412E−04 | 4.7240349E−04 |
| A7 | 2.3926597E−05 | −1.8581759E−04 |
| A8 | 8.9679619E−06 | 3.0411433E−05 |
| A9 | −2.7196970E−06 | 3.9651513E−06 |
| A10 | −2.5227426E−07 | −2.5927741E−06 |
| A11 | 1.5258946E−07 | 3.3213767E−07 |
| A12 | −9.2045049E−10 | 3.1183329E−08 |
| A13 | −4.8858898E−09 | −1.2441849E−08 |
| A14 | 3.3574702E−10 | 7.7954554E−10 |
| A15 | 7.3872241E−11 | 1.1603892E−10 |
| A16 | −8.4047068E−12 | −1.9345948E−11 |
| A17 | −3.9515642E−13 | 4.6243693E−13 |
| A18 | 7.1326566E−14 | 9.2310024E−14 |
| A19 | −1.0318035E−16 | −7.7291813E−15 |
| A20 | −1.5626440E−16 | 1.8590567E−16 |

Table 11 shows specs of the imaging lenses of Examples 1 through 5 and corresponding values of conditional expressions (1) through (5). At Table 11, f is the focal length of the entire system, BF is a back focus, 2ω is a full angle of view, Fno. is a F-number, and θgF is a partial dispersion ratio between the g-line and the F-line with respect to the material of one lens L12b of positive lenses included in the twelfth lens group G12. The values represented in Table 11 are values with the d-line as the reference. As shown in Table 11, all of the imaging lenses of Examples 1 through 5 satisfy conditional expressions (1), (2), and (5); and the imaging lenses of Examples 3 and 4 satisfy all the conditional expressions (1) through (5) and further satisfy all the conditional expressions (1-1) through (4-1) which specifies more preferable ranges within the ranges defined by conditional expressions (1) through (4). The advantageous effects obtained thereby are as described above.

TABLE 11

| | Example 1 | Example 2 | Example 3 | Example 4 | Example 5 |
|---|---|---|---|---|---|
| f | 23.71 | 23.75 | 23.77 | 23.74 | 23.84 |
| BF | 15.39 | 14.93 | 14.88 | 12.60 | 13.72 |
| 2ω | 61.9 | 61.7 | 61.7 | 61.7 | 61.5 |
| Fno. | 1.45 | 1.45 | 1.45 | 1.45 | 1.45 |
| θgF | 0.5667 | 0.5667 | 0.6133 | 0.6133 | 0.5667 |
| Conditional Expression (1) | 1.88300 | 1.88300 | 1.88300 | 1.88300 | 1.88300 |
| Conditional Expression (2) | 1.88300 | 1.88300 | 2.00069 | 2.00069 | 1.88300 |
| Conditional Expression (3) | −0.0088 | −0.0088 | 0.0130 | 0.0130 | −0.0088 |
| Conditional Expression (4) | 40.8 | 40.8 | 25.5 | 25.5 | 40.8 |
| Conditional Expression (5) | 18.0 | 18.0 | 15.8 | 9.7 | 15.8 |

FIG. 1 shows an example in which the optical member PP is disposed between the lens system and the image formation plane Sim. However, instead of disposing a low-pass filter, various types of filters for cutting a specific wavelength, and the like between the lens system and the image formation plane Sim, these various types of filters may be disposed between the lenses or a coating which exhibits the same effects as the various types of filters may be applied to surfaces of any lenses.

As can be seen from the respective numerical value data and aberration diagrams as shown above, the imaging lens according to each of Examples 1 through 5 has a fast lens system with a F-number of 1.45 while achieving miniaturization. Moreover, each of aberrations is favorably corrected in the imaging lens.

[An Embodiment of Imaging Apparatus]

Figure 11:
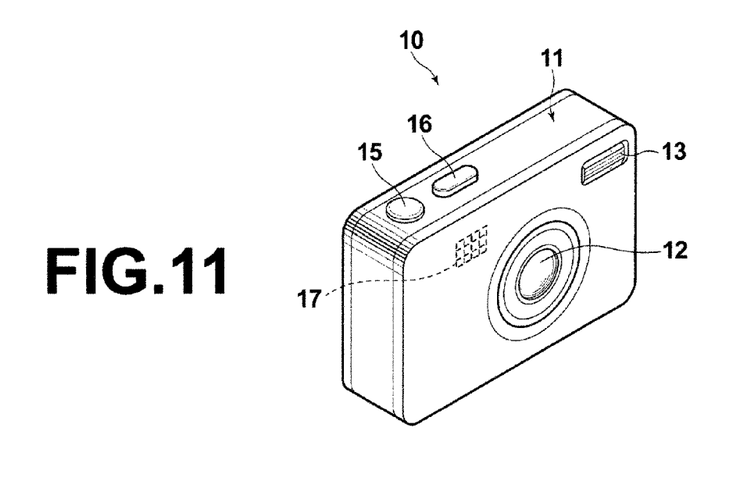
FIG. 11 is a schematic configuration diagram of an imaging apparatus according to an embodiment of the present invention.

Next, the imaging apparatus according to the present invention will be described. FIG. 11 shows a perspective view of a camera according to one embodiment of the present invention. The camera 10 shown therein is a compact digital camera, and a compact imaging lens 12 according to the embodiment of the present invention is provided on the front and in the interior of a camera body 11. Further, a flash light emitting device 13 for emitting flash light onto a subject is provided on the front of the camera body 11, a shutter button 15 and a power button 16 are provided on the upper surface of the camera body 11, and an imaging element 17 is disposed in the interior of the camera body 11. The imaging element 17, which is, for example, a CCD, a CMOS, or the like, images optical images formed by a compact wide angle lens 12 and converts them into electric signals.

As described above, since the imaging lens 12 according to the embodiments of the present invention achieves sufficient miniaturization, the camera 10 can be compact both when carrying the camera and when photographing, even without adopting a collapsible mount type. Alternatively, in the case that a collapsible mount type is adopted, cameras, which is more compact and excellent in portability compared to conventional collapsible mount type cameras, can be provided.

Moreover, the images obtained by the camera 10, to which the imaging lens 12 according to the present invention is applied, can be bright excellent-quality images.

Figure 12:
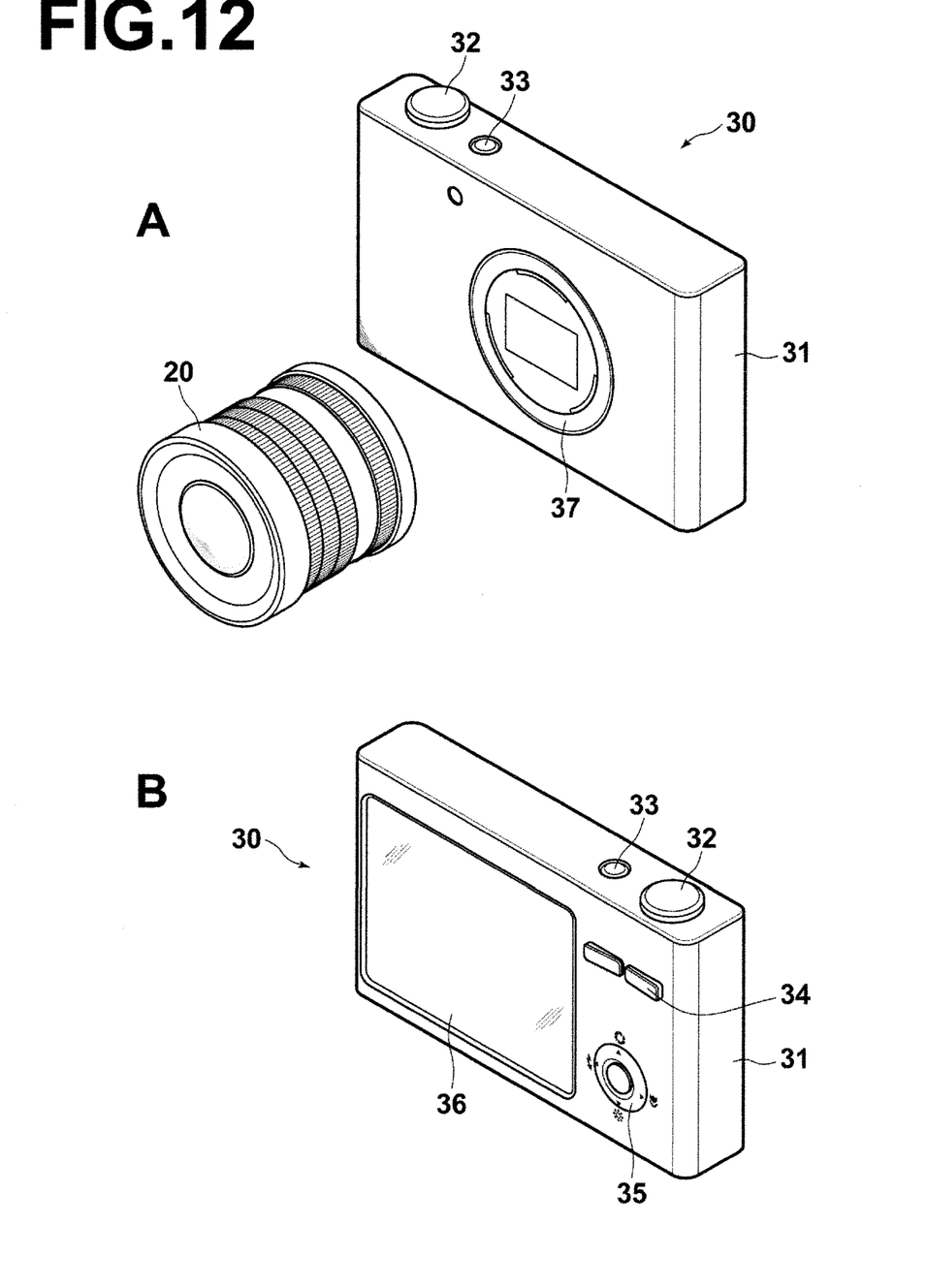

Next, another embodiment of the imaging apparatus according to the present invention will be described with reference to FIG. 12. A camera 30, a perspective view of which is shown therein and which is detachably equipped with an interchangeable lens 20, is a so-called mirrorless single-lens digital camera. A of FIG. 12 shows an outside appearance of this camera 30 viewed from the front, and B of FIG. 12 shows an outside appearance of this camera 30 viewed from the back.

This camera 30 includes a camera body 31 provided with a shutter button 32 and a power source button 33 on the upper surface thereof. Further, operation sections 34 and 35 as well as a display section 36 are on the back surface of the camera body 31. The display section 36 displays photographed images and images to be photographed within the angle of view.

A photographing aperture, into which light from a photographing object enters, is provided in the center of the front surface; a mount 37 is provided on a position corresponding to the photographing aperture; and an interchangeable lens 20 is mounted to the camera body 31 through the mount 37. The interchangeable lens 20 houses the imaging lens 1 according to the present embodiments within a barrel.

The camera body 31 is provided with an imaging element (not shown), such as a CCD, and the like, which receives a subject image formed by the interchangeable lens 20 and outputs imaging signals in response thereto; a signal processing circuit which processes imaging signals output from the imaging element and which generates images; a recording medium for recording the generated images; and the like. I this camera 30, a still image by one flame is photographed by pressing a shutter button 32 and the image data obtained by this photography is recorded on the above recording medium.

By applying the imaging lens according to the present invention to the interchangeable lens 20 which is used for such a mirrorless interchangeable lens camera 30, the camera 30 can be sufficiently compact in a state in which the lens is mounted thereon, and be capable of obtaining bright and excellent-quality images.

The present invention has been described with reference to the Embodiments and Examples. The present invention is not limited to the embodiments and the examples described above, and various modifications are possible. For example, values, such as the radius of curvature of each lens component, the distances between surfaces, the refractive indices, the Abbe numbers, aspheric surface coefficients, and the like are not limited to the values in the numerical examples, but may be other values.

What is claimed is:

1. An imaging lens substantially consisting of:
a first lens group having positive refractive power, an aperture stop, and a second lens group having positive refractive power, in this order from the object side,
the first lens group being composed of an eleventh lens group and a twelfth lens group, in this order from the object side, with a largest air space therebetween,
the eleventh lens group having negative refractive power and consisting of at least one negative lens with a concave surface toward the image side,
the twelfth lens group having positive refractive power, and
the second lens group comprising an aspheric lens having at least one aspheric surface and a three-cemented lens formed by a positive lens, a negative lens, and a positive lens in this order from the object side,
wherein the imaging lens satisfies conditional expression (1) below:

$$Nd2 > 1.8 \quad (1),$$

where,
Nd2: the average value of the refractive index with respect to the d-line of the materials of positive lenses in the three-cemented lens.

2. The imaging lens of claim 1, wherein the twelfth lens group consists of one positive lens, one positive lens with a convex surface toward the object side, and one negative lens with a concave surface toward the image side in this order from the object side, the lenses of the twelfth lens group being adjacent to each other.

3. The imaging lens of claim 1, wherein the three-cemented lens is formed by cementing a positive lens with a convex surface toward the image side, a negative lens, and a positive lens with a convex surface toward the image side in this order from the object side.

4. The imaging lens of claim 1, wherein the imaging lens satisfies conditional expression (2) below:

$$Nd12a > 1.8 \quad (2),$$

where,
Nd12a: the refractive index with respect to the d-line of the material of a positive lens having the highest refractive index with respect to the d-line in the twelfth lens group.

5. The imaging lens of claim 1, wherein the imaging lens satisfies conditional expressions (3) and (4) below:

$$0 < \theta gF12b - 0.6415 + 0.001618 \times \nu d12b \quad (3), \text{ and}$$

$$\nu d12b < 35 \quad (4),$$

where,
νd12b: the Abbe number with respect to the d-line of the material of one lens L12b of positive lenses included in the twelfth lens group, and
θgF12b: a partial dispersion ratio between the g-line and the F-line with respect to the material of one lens L12b of positive lenses included in the twelfth lens group.

6. The imaging lens of claim 1, wherein the imaging lens satisfies conditional expression (5) below:

$$\nu d2p - \nu d2n > 5 \quad (5),$$

where,
νd2p: the Abbe number of the material of a lens having a larger Abbe number with respect to the d-line of two positive lenses in the three-cemented lens, and
νd2n: the Abbe number with respect to the d-line of the material of a negative lens of the three-cemented lens.

7. The imaging lens of claim 1, wherein the eleventh lens group has at least two negative lenses with concave surfaces toward the image side.

8. The imaging lens of claim 1, wherein the second lens group consists of one or more lenses on the image side of the three-cemented lens, and
focus adjustment from an object at infinity to an object at a close distance is performed by moving a part, which includes the aspheric lens and the three-cemented lens, of the second lens group, or by moving the entire second lens group toward the object side.

9. The imaging lens of claim 8, wherein the first lens group is fixed during focus adjustment from an object at infinity to an object at a close distance.

10. The imaging lens of claim 8, wherein one or more lenses on the image side of the three-cemented lens in the second lens group through a lens on the most image side in the second lens group are fixed during focus adjustment from an object at infinity to an object at a close distance.

11. The imaging lens of claim 10, wherein the fixed lenses or lens groups have negative refractive power.

12. The imaging lens of claim 1, wherein the imaging lens satisfies conditional expression (1-1) below:

$$Nd2 > 1.85 \qquad (1\text{-}1),$$

where,

Nd2: the average value of the refractive index with respect to the d-line of the materials of positive lenses in the three-cemented lens.

13. The imaging lens of claim 1, wherein the imaging lens satisfies conditional expression (2-1) below:

$$Nd12a > 1.85 \qquad (2\text{-}1),$$

where,

Nd12a: the refractive index with respect to the d-line of the material of a positive lens having the highest refractive index with respect to the d-line in the twelfth lens group.

14. The imaging lens of claim 1, wherein the imaging lens satisfies conditional expressions (3-1) and (4-1) below:

$$0.012 < \theta gF12b - 0.6415 + 0.001618 \times vd12b \qquad (3\text{-}1), \text{ and}$$

$$vd12b < 27 \qquad (4\text{-}1),$$

where, vd12b: the Abbe number with respect to the d-line of the material of one lens L12b of positive lenses included in the twelfth lens group, and θgF12b: a partial dispersion ratio between the g-line and the F-line with respect to the material of one lens L12b of positive lenses included in the twelfth lens group.

15. An imaging apparatus equipped with the imaging lens of claim 1.

\* \* \* \* \*